(12) United States Patent
Legzdins

(10) Patent No.: US 11,679,998 B2
(45) Date of Patent: Jun. 20, 2023

(54) METHOD AND APPARATUS FOR ELECTROCHEMICAL PURIFICATION OF WASTEWATER

(71) Applicant: OxByEl Technologies, Inc., Mesa, AZ (US)

(72) Inventor: Colleen Legzdins, West Vancouver (CA)

(73) Assignee: OxByEl Technologies, Inc., Mesa, AZ (US)

( * ) Notice: Subject to any disclaimer, the term of this patent is extended or adjusted under 35 U.S.C. 154(b) by 1023 days.

(21) Appl. No.: 16/458,608

(22) Filed: Jul. 1, 2019

(65) Prior Publication Data

US 2020/0002195 A1 Jan. 2, 2020

Related U.S. Application Data

(60) Provisional application No. 62/691,803, filed on Jun. 29, 2018.

(51) Int. Cl.
*C02F 1/461* (2023.01)
*C02F 1/42* (2023.01)
*C02F 103/34* (2006.01)

(52) U.S. Cl.
CPC ............ *C02F 1/46114* (2013.01); *C02F 1/42* (2013.01); *C02F 2001/422* (2013.01); *C02F 2001/46133* (2013.01); *C02F 2001/46152* (2013.01); *C02F 2103/34* (2013.01); *C02F 2201/46115* (2013.01)

(58) Field of Classification Search
CPC .................. C02F 2001/46152; C02F 1/46114
See application file for complete search history.

(56) References Cited

U.S. PATENT DOCUMENTS

| 4,710,233 A | 12/1987 | Hohmann et al. |
| 5,989,407 A | 11/1999 | Andrews et al. |
| 6,126,796 A | 10/2000 | Shimamune et al. |
| 2006/0118485 A1 | 6/2006 | Gallagher et al. |
| 2017/0362722 A1 | 12/2017 | Jung et al. |

FOREIGN PATENT DOCUMENTS

| CA | 2289938 C | 2/2007 | |
| WO | WO-2008034634 A1 * | 3/2008 | ............ C02F 1/4672 |

OTHER PUBLICATIONS

International Search Report in corresponding PCT/US2019/039434 dated Oct. 24, 2019 (pp. 1-6).

\* cited by examiner

*Primary Examiner* — Ciel P Contreras
(74) *Attorney, Agent, or Firm* — Millen, White, Zelano & Branigan, PC; Ryan Pool

(57) ABSTRACT

The invention of the current application is directed to a wastewater treatment apparatus. The invention includes a divided membrane electrochemical cell including an anode contained within a anode compartment and cathode contained within a cathode compartment. The anode compartment and said cathode compartment are separated by a proton selective membrane. The invention also includes a voltage source, and a liquid-gas separator. The invention is an economically viable electrochemical advanced oxidation system that can cost-effectively treat recalcitrant COD with low energy, without the necessity for chemicals, and reduce or prevent sludge production in a single step.

16 Claims, 6 Drawing Sheets

Direction of wastewater flow

Direction of wastewater flow

↑
Direction of wastewater flow

↑
Direction of wastewater flow

↑
Direction of wastewater flow

↑
Direction of
wastewater flow

METHOD AND APPARATUS FOR ELECTROCHEMICAL PURIFICATION OF WASTEWATER

BACKGROUND

There is substantial growth in the demand for new wastewater treatment technologies. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The industry desires cost-effective, sustainable water treatment technology that does not require the addition of chemicals and does not produce secondary pollution, is compliant with stringent water quality standards, and has minimal operational and maintenance requirements.

Industrial wastewater contains organic and inorganic compounds, many of which are toxic, persistent and resist conventional biological and physical-chemical wastewater treatment. The best approach in the prior art is to treat recalcitrant wastewater by advanced oxidation processes (AOPs). Advanced oxidation processes generate high concentrations of hydroxyl radical. The hydroxyl radical (OH*) is a significantly more powerful oxidant compared to other oxidants and is used to destroy constituents that cannot be oxidized completely by conventional oxidants. See Table 1 below showing relevant comparisons. Fluoride (F), for example, is corrosive to process unit catalysts and is a large health and safety concern. Hydrogen peroxide ($H_2O_2$) has similar properties to a lesser extent.

TABLE 1

Oxidizing Potential (CRC Handbook 1985) pH~0

| Species | Potential (V) |
|---|---|
| F | 3.0 |
| OH* | 2.8 |
| O* | 2.42 |
| $O_3$ | 2.07 |
| $H_2O_2$ | 1.77 |
| $KMnO_4$ | 1.7 |
| $ClO_2$ | 1.5 |
| $Cl_2$ | 1.36 |
| $O_2$ | 1.23 |

The hydroxyl radical reacts non-selectively with organic matter and is used to reduce chemical oxygen demand (COD), total organic carbon (TOC), color, and odor in wastewater. The hydroxyl radical not only degrades organic contaminants, but also oxidizes inorganic compounds such as hydrogen sulfide, ammonia, metals and cyanide. The hydroxyl radical is also capable of disinfecting pathogens and bacteria in water. The degradation of organics by OH* is through radical addition, hydrogen abstraction and electron transfer. An important feature of OH* oxidation process is that the oxidation rate constant/speed of reaction is several orders of magnitude higher versus other strong oxidants. Table 2 compares the rate constant of OH* versus ozone ($O_3$) for difficult to treat pollutants found in industrial wastewaters.

TABLE 2

$2^{nd}$ Order Rate Constants Hydroxyl Radical vs. Ozone (L/mole/s) (Ref: Cater 1990, Dussert 1997, Buxton 1985, Glaze 1990, Rosenfeldt 2004, Crittenden 2005)

| Compound | OH* | $O_3$ |
|---|---|---|
| Endrin (organo chloride) | $10^9$ | <0.02 |
| Chloroethene (vinyl chloride) | $10^{10}$ | $10^4$ |
| Trichloroethene | $10^9$ | 17 |
| Tetrachloroethene | $10^9$-$10^{10}$ | <0.1 |
| Benzene | $10^9$-$10^{10}$ | 2 |
| Toluene | $10^9$-$10^{10}$ | 14 |
| o-Xylene | $10^9$-$10^{10}$ | 90 |
| MTBE | $10^9$ | 0.14 |
| Chloroform | $10^7$-$10^8$ | <0.1 |
| PCBs | $10^9$-$10^{10}$ | |
| PAHs | $10^{10}$ | |
| Aromatics | $10^8$-$10^{11}$ | 1-$10^2$ |
| Nitrogen containing organics | $10^8$-$10^{11}$ | 10-$10^2$ |
| Carboxylic acids | $10^7$-$10^9$ | $10^{-3}$-$10^{-2}$ |
| Phenol | $10^9$-$10^{11}$ | $10^3$ |
| Sulfur containing organics | $10^9$-$10^{10}$ | 10-$10^3$ |
| Ammonia | $10^7$-$10^8$ | 20 |
| $H_2S$ | $10^{10}$-$10^{11}$ | $10^4$-$10^5$ |
| Atrazine | $10^9$-$10^{10}$ | 6 |
| Carbofuran | $10^9$-$10^{10}$ | 620 |
| Alachlor | $10^9$-$10^{10}$ | 4 |

Advanced oxidation processes that generate OH* in sufficient quantity at normal pressures and temperatures include chemical advanced oxidation processes (AOPs) (UV (ultraviolet light)/$H_2O_2$, UV/$O_3$, UV/$O_3$/$H_2O_2$, $H_2O_2$/$O_3$), Fenton's Reagent ($Fe^{++}$/$H_2O_2$) and electrochemical AOP (eAOP) which is the subject of this application. The chemical equations of hydroxyl radical formation for each process are shown below.

Examples of general oxidation reactions for various chemical versus electrochemical AOPs are shown below.

$$H_2O_2 + h\nu \rightarrow 2OH^* \qquad UV/H_2O_2$$

$$O_3 + H_2O + h\nu \rightarrow O_2 + H_2O_2$$

$$2O_3 + H_2O_2 \rightarrow 2OH^* + 3O_2 \qquad UV/O_3$$

$$2O_3 + H_2O_2 \rightarrow 2OH^* + 3O_2 \qquad H_2O_2/O_3$$

$$Fe^{++} + H_2O_2 \rightarrow Fe^{+++} + OH^- + OH^* \qquad \text{Fenton's}$$

$$H_2O \rightarrow OH^*_{ads} + H^+ + e^-$$

$$(H_2O \rightarrow O^*_{ads} + H^+ + e^-) \qquad \text{Electrochemical (anode half-cell)}$$

The oxidation of pollutants by chemical AOPs is inefficient and complex at high COD concentrations characteristic of industrial wastewater. The processes are sensitive to water chemistry, particularly: reactant solubility limits, OH* scavengers, UV light absorbers, pH, total suspended solids (TSS), temperature, and reactant scavengers. For these reasons, chemical AOPs like ozone are only a cost-effective treatment for very low COD concentration water such as drinking water, for micro-pollutants and for disinfection, but not for industrial wastewater. Fenton's Reagent is widely used for treating industrial wastewater. But the process is also complex and sensitive to temperature and water chemistry. Fenton's Reagent requires acidic pH control and careful dosing of the hydrogen peroxide. Fenton's Reagent is inefficient at low COD concentration and does not achieve complete removal in many instances due to iron complexing with organic species. Post-treatment is required for both chemical AOPs and Fenton's Reagent. The chemical AOPs require the removal of excess $H_2O_2$ and $O_3$, and Fenton's Reagent requires the removal of excess $H_2O_2$, iron salts and iron sludge. Conversely, a electronic advanced oxidation process (eAOP) does not require any chemical reagents, is simple and relatively insensitive to water quality, treats a wide range of COD, and does not produce secondary pollution.

There exists a need for an economically viable electrochemical advanced oxidation system that can cost-effectively treat recalcitrant COD with low energy, no chemicals, and no sludge production in a single step. The electrochemical cell, treatment plant and oxidation methods described herein provide an effective solution.

The eAOP cost competitiveness depends mainly on the electrode materials, type of electrolytic reactor, cell architecture, and energy required to run the process. The disadvantages of prior art eAOP systems include: single, undivided chamber reactor designs that suffer from high energy consumption; electrodes with high anode & cathode overpotentials that require high voltage to generate OH* that increases energy consumption; cell architectures with high ionic and ohmic transport losses that increase cell voltage and energy consumption; cell architectures with high mass transport losses that lower oxidation efficiency at low COD concentrations and increase energy consumption; high internal resistance between electrodes requiring the addition of supporting electrolyte to the wastewater to increase its conductivity which adds the cost of these chemicals and their handling; expensive electrodes such as boron doped diamond that increase capital costs; electrodes borrowed from other processes (e.g. chlor-alkali) that are inefficient in OH* generation and produce unwanted side reactions (e.g. $Cl_2$ evolution in chloride containing wastewater); unwanted parasitic reactions and back reactions that reduce OH* generation and increase energy consumption; added costs and complexity of batch recirculation systems; reactor and cell architectures that facilitate fouling of cathode with inorganic deposition increasing cell resistance and energy consumption; and passivation and/or dissolution of electrode materials contributing to increased resistivity and/or cell instabilities.

SUMMARY OF THE INVENTION

The invention of the current application is a divided membrane electrochemical cell including an anode and cathode separated by a proton selective membrane. An overview of the preferred embodiment is as follows:

1) The wastewater is fed into the anode compartment using continuous or intermittent stable, pulsed or oscillating flow. The flow rate of wastewater may be varied depending on the influent COD concentration and treatment objective.

2) A cell voltage is applied that provides the desired OH* reaction. Anode voltage is applied at all points on the 3D anode by monitoring the anode reference electrode voltage. In the preferred embodiments, the electrode port is located at a point where the 3D anode voltage is lowest. The voltage may be applied with a periodic variation in the voltage as pulse voltage steps (e.g. square, triangular or sine waves) to enhance ionic discharge and improve energy efficiency.

3) The wastewater COD and other contaminants are oxidized by the OH* generated by the anode catalyst surface as it passes through the anode compartment. Wastewater flows through a 3D electrode perpendicular to current flow. Two degrees of freedom (thickness and length) of the electrode make it possible to obtain, simultaneously, a uniform potential distribution and short residence time. This results in a more adaptable system for industrial use.

4) The treated wastewater exits the anode compartment and is either discharged, directed to a central wastewater plant or directed to further treatment for water reuse applications.

5) A side-stream of the anode effluent is directed to the cathode compartment, either continuously or intermittently. The effluent is first passed through a pre-treatment unit to remove anions, cations and dissolved $CO_2$ if these contaminants are present in copious amounts. Ion exchange resin, capacitive deionization, or electro-deionization may be used. In the preferred embodiment, capacitive deionization is used.

6) The side-stream effluent is then fed to the cathode compartment to prevent fouling and any $H_2$ bubble accumulations.

7) After the side-stream passes through the cathode, it is discharged back into the wastewater, either at a point before feeding into the anode or into the treated effluent.

8) The cathode liquid and $H_2$ product gas exit the cathode compartment to a gravity liquid-gas separator. The liquid stream from the separator is fed to the treated effluent stream and/or the influent wastewater stream, and the $H_2$ gas is vented or flared to ambient atmosphere.

9) The cell voltage, cell current, feed wastewater pH, cell temperature, cathode feed water pH, anode voltage and cathode voltage are measured. Using the measured values of wastewater COD concentration and cell current, the oxidation efficiency is determined. The cell voltage, cell current and wastewater COD concentration, are used to determine the energy consumption of the process. The cell voltage, cell current, pH, temperature, and electrode voltages, are used to determine the iR losses and electrode overvoltages.

The state of the process is continuously (automated) monitored regarding the values of flow rate, electrode voltages, overvoltages, iR loss, cell current, cell voltage, pH, temperature and wastewater COD. The values of one or more of the above, alone or in combination, are used to control oxidation, initiate anode and/or cathode cleaning, check/repair cell electrical connections, check/repair/replace electrodes, check/repair/replace sensors and pumps, and to maintain efficiency and performance.

Fluid flow distributors which may be sets of narrow slot-hole gaps, porous frit, grid porous plate or porous beads are incorporated at the entrance and optionally at points along the electrode to prevent flow channeling. The flow distributor material may be inert, and electrically and/or ionic conducting.

To minimize the pressure drop through the 3D electrode, prevent product $CO_2$ gas from becoming trapped in the electrode pore network and ensure adequate mass transfer in the pores, the electrode permeability is kept above $1 \times 10^{-10}$ $m^2$.

Pulse flow, pulse ultrasound, and/or oscillating flow (e.g. centrifugal pump), pressure pulses are used to detach bubbles and increase mass transport by reducing the size of the boundary layer.

Buss bar/external circuits are used to minimize hardware iR losses which are practical inefficiencies and electrode-electrical connector design is used to minimize heat losses and to minimize contact ageing.

The anode effluent liquid and $CO_2$ product gas exit the anode compartment to a gravity liquid-gas separator. The $CO_2$ product gas is vented and passed through a scrubber (carbon canister) to ambient atmosphere. When the influent wastewater has a high COD concentration, greater than 10,000-20,000 mg/L, product $CO_2$ gas removal in the wastewater is achieved at anode electrode transition region(s) at points along the electrode length. If the gas is not vented, the system can experience a loss of efficiency due to blocked reaction sites.

Luggin capillary ports are included for reference electrodes to measure anode and cathode voltage, membrane/electrolyte voltage losses, feedback for cell voltage control and if required, cathode cleaning sequence. Scale buildup increases cell resistance thereby increasing cell voltage.

The system accommodates wastewater line pressure by seal design and compression of the outer anode and cathode housings. The system is enclosed so that no air emissions escape without first passing through scrubbers or gas purifiers.

The system eliminates stray leakage currents by using non-conductive cell feeds and exits, grounded or non-conductive headers, high resistance fluid paths and/or stray current collectors.

In some embodiments, the system provides sealing to accommodate high pressure using sealing gaskets and cell compression, materials to accommodate high temperature, and an auxiliary electrode for cathode/anode cell reversal.

The process of the current invention involves two separate reactions, an Anode reaction and a Cathode reaction, these two reactions occur within chambers separated by a membrane. The Anode reaction is $H_2O \rightarrow OH^* + H^+ + e^-$ while the Cathode reaction is $2H^+ + 2e^- = H_2$. These reactions combine as follows: $2H_2O \rightarrow 2OH^* + H_2$. The contaminants (COD) are oxidized by the electrochemically generated OH* at the anode surface, producing water, protons, electrons, and product gases $CO_2$ and $N_2$.

For example, an eAOP treatment for organic compounds is shown below:

$$(C_aH_bO_cN_d) + OH^* \rightarrow CO_2 + N_2 + H_2O + H^+ + e^-$$

The eAOP treatment for inorganics such as ammonia and hydrogen sulfide is below:

$$2NH_3 + OH^* \rightarrow N_2 + H_2O + 5H^+ + 5e^-$$

$$2NH_4^+ + OH^* \rightarrow N_2 + H_2O + 7H^+ + 7e^-$$

$$H_2S + OH^* \rightarrow S^\circ + H_2O + H^+ + e^-$$

The protons produced at the anode are transported through the proton selective membrane to the cathode and the produced electrons are transported through the electrical connections to the cathode. Hydrogen is formed at the cathode by the recombination of the protons and electrons. The anode product gases, $CO_2$ and $N_2$, are separated from the effluent wastewater and passed through a carbon canister to remove any fugitive volatiles. The cathode product gas, $H_2$, is either vented, captured or flared.

An example for eAOP of phenol follows:

Example 1—Phenol Oxidation $$12H_2O \rightarrow 12OH^* + 12H^+ + 12e^-$$

$$C_6H_6O + 12OH^* \rightarrow 6CO_2 + H_2O + 16H^+ + 16e^-$$

$$C_6H_6O + 11H_2O \rightarrow 6CO_2 + 28H^+ + 28e^- \quad \text{Anode:}$$

$$2H^+ + 2e^- = H_2 \quad \text{Cathode:}$$

$$C_6H_6O + 11H_2O \rightarrow 6CO_2 + 28H^+ + 28e^-$$

$$28H^+ + 28e^- \rightarrow 12H_2$$

$$C_6H_6O + 11H_2O \rightarrow 6CO_2 + 12H_2 \quad \text{Overall Oxidation reaction:}$$

The current efficiency of the treatment process (COD oxidation) can be calculated from the measurement of feed wastewater COD. At 100% current efficiency, 1 mole of electrons will oxidize 8,000 mg of COD. Therefore, 3.35 Amp-hrs are required to oxidize 1,000 mg of COD. By monitoring the cell current, the faradic efficiency of the oxidation process can be determined and monitored during treatment.

The cell voltage required to generate the OH* is the sum of the minimum electrode thermodynamic reaction voltages E, the iR loss due to proton transport losses, the iR loss due to electrical resistances, joule heating, the anode overvoltage and the cathode overvoltage.

$$V_{cell} = E_{anode} + E_{cathode} + iR_{electric} + iR_{proton} + iR_{heat} + \eta_{anode} + \eta_{cathode}$$

The electrode overvoltage, η, is the voltage due to reaction resistances (e.g. activation energies, bubble accumulation, parasitic/side reactions, etc.), and can be lowered by electrocatalyst material design and convective mass transport. Both electrical and ionic transport resistances cause heat generation that contribute to Ohmic losses. To effect an energy efficient treatment process, the iR losses and overpotentials are minimized in this invention.

For electrochemical oxidation of wastewater generating OH* on an electrode surface, the flow of wastewater past an electrode surface (forced convection) is mass transport limited and the limiting current is defined as:

$$I_L = zFkA_sC_b$$

where: z=number of electrons per equivalent
F=Faraday's constant
k=mass transfer coefficient
$A_s$=electrochemical active electrode surface area
$C_b$=bulk COD concentration By maximizing the mass transport coefficient and the electrochemical active surface area of the electrode, the OH* reaction limiting current is increased and the rate of COD decomposition is improved. The OH* reaction rate is defined by:

$$R = 1 - \exp[-kA_eV/Q]$$

where: V=volume of electrode
Q=volumetric flow rate of wastewater
$A_e$=electrode specific surface area per unit volume of total electrode And the COD concentration leaving the anode is defined by:

$$C_{exit} = C_o(1-R)$$

where: $C_o$ is the initial COD bulk concentrations.

As wastewater flows past the electrode surface, the bulk COD concentration is reduced as oxidation progresses. As the COD is reduced along the length of the electrode, a constant $(kA_e)$ results in a decreasing limiting current at each subsequent segment of electrode reducing the projected current density which results in an uneven current density along the length of the electrode and loss of oxidation efficiency. Therefore, in order to maintain a uniform limiting current and projected current density along the length of the electrode in the direction of wastewater flow (inlet to outlet), the product, $(kA_s)$, of the mass transfer coefficient and the active surface area, $A_s$, must be increased proportionally to the reduction in bulk COD concentration as oxidation proceeds. Depending on the wastewater characteristics, this can be achieved by increasing $A_s$, and/or k individually or together along the length of the electrode.

The anode in this invention incorporates a 3D electrode with variable $A_s$ and/or k along the length of the anode in the direction of wastewater flow. To demonstrate the advantages of the 3D electrode with variable $A_s$ and k, the following examples are shown for an initial wastewater COD concentration of 2000 mg/L, a flow rate of 1 gph, and an anode compartment with a constant volume of 10 cm wide, 5 mm height and 40 cm length. A comparison of the exit COD concentration and the limiting current at the front and a point along the electrode length (direction of wastewater flow) is shown below for the cases of (1) flat plate; (2) 3D electrode, constant k and $A_e$; (3) 3D electrode, constant k and variable $A_e$ (this invention); (4) 3D electrode, variable k and constant $A_e$ (this invention); and (5) 3D electrode, variable k and variable $A_e$ (this invention).

Case 1. Flat Plate, Constant Mass Transfer Coefficient and Electrode Surface Area

| Initial Bulk COD (mg/L) | Mass transfer coefficient (m/s) | Ae (m2/m3) | $C_{exit}$ (mg/L) | Limiting Current at front end of electrode (A) | Limiting Current at ¾ point along length (A) |
|---|---|---|---|---|---|
| 2000 | 1 × 10⁻⁵ | 200 | 1368 | 6.3 | 1.7 |

Case 2. 3D Electrode, Constant Mass Transfer Coefficient and Electrode Surface Area

| Initial Bulk COD (mg/L) | Mass transfer coefficient (m/s) | Ae (m2/m3) | $C_{exit}$ (mg/L) | Limiting Current at front end of electrode (A) | Limiting Current at ¾ point along length (A) |
|---|---|---|---|---|---|
| 2000 | 1 × 10⁻⁵ | 400 | 935 | 11 | 2.5 |

Case 3. 3D Electrode, Constant Mass Transfer Coefficient and Variable Surface Area (this Invention)

| Initial Bulk COD (mg/L) | Mass transfer coefficient (m/s) | Ae (m2/m3) first ¾ of electrode length | Ae (m2/m3) last ¼ of electrode length | $C_{exit}$ (mg/L) | Limiting Current at front end of electrode (A) | Limiting Current at ¾ point along length (A) |
|---|---|---|---|---|---|---|
| 2000 | 1 × 10⁻⁵ | 400 | 3000 | 272 | 11 | 10.9 |

Case 4. 3D Electrode, Variable Mass Transfer Coefficient and Constant Surface Area (this Invention)

| Initial Bulk COD (mg/L) | Mass transfer coefficient (m/s) first ¾ of electrode length | Mass transfer coefficient (m/s) last ¼ of electrode length | Ae (m2/m3) | $C_{exit}$ (mg/L) | Limiting Current at front end of electrode (A) | Limiting Current at ¾ point along length (A) |
|---|---|---|---|---|---|---|
| 2000 | 1 × 10⁻⁵ | 7.5 × 10⁻⁵ | 400 | 272 | 11 | 10.9 |

Case 5. 3D Electrode, Variable Mass Transfer Coefficient and Variable Surface Area (this Invention)

| Initial Bulk COD (mg/L) | Mass transfer coefficient (m/s) first ¾ of electrode length | Mass transfer coefficient (m/s) last ¼ of electrode length | Ae (m2/m3) first ¾ of electrode length | Ae (m2/m3) last ¼ of electrode length | $C_{exit}$ (mg/L) | Limiting Current at front end of electrode (A) | Limiting Current at ¾ point along length (A) |
|---|---|---|---|---|---|---|---|
| 2000 | 2.5 × 10⁻⁵ | 4 × 10⁻⁵ | 200 | 3000 | 3 | 12.9 | 12.4 |

The results show that a uniform current is only provided by the 3D electrode with variable mass transfer coefficient k and/or surface area $A_s$ (Cases 3, 4, 5). In addition, nearly 100% COD decomposition with a uniform current results from a 3D electrode with variable mass transfer coefficient k and surface area $A_s$. The COD exit concentration from the plate electrode is 1368 mg/L, from the 3D electrode with constant ($kA_s$) is 935 mg/L versus 3 mg/L from the 3D electrode with variable k and $A_s$. The improvement in oxidation is significant with the 3D electrode with variable ($kA_s$).

For low bulk concentrations of COD, low catalyst surface current densities result. A high surface area 3D anode of the invention allows for low current density at catalyst-wastewater interface but a relatively high current/unit cell volume for process efficiency. Conversely, for high bulk concentrations of COD, high catalyst surface current densities result. A lower surface area 3D anode with a variable mass transfer coefficient allows for control of the current density at the catalyst-water interface keeping the current/unit cell volume from exceeding the upper limit of the cell design. A high cell current increases cell iR losses and produces excessive $CO_2$ product gas. Limiting the ratio of the active electrode surface area to compartment volume in electrodes/electrode segments with high COD may be effected to prevent too much product $CO_2$ gas evolution and the subsequent accumulation that would block active sites.

The result of 3D electrode surface area size on the calculated electrode surface current density and the current density per unit cell volume are shown in the table below for a high COD wastewater of 10,000 mg/L and a low COD wastewater of 500 mg/L, both at a volumetric flow rate of 2 gal/hr. The anode unit cell volume for the 10,000 mg/L wastewater is 125 cm$^3$ and the unit cell volume for the 500 mg/L wastewater is 25 cm$^3$. The anode surface areas of #1-3 are equivalent to one-sided or a 2-sided flat plate. The surface areas of #4 & 5 are equivalent to a packed bed of particles with a diameter of 0.5 mm. Comparing the high COD example #2 versus low COD example #4, although the surface current density of example #2 is 140× larger than example #4, the current density per unit cell volume for #2 and #4 are within 15% of each other. In this way, the anode compartment can be segmented to maximize oxidation efficiency while keeping the current density uniform.

surfaces with features such as dimples, and adding inert or catalytically active (catalyst coated) turbulence promotors (e.g. glass beads, fibers, and expanded mesh).

A non-uniform electrode compartment volume along the length of the electrode may also be incorporated to influence mass transfer, fluid velocity, surface area and/or residence time.

Altering the compartment dimensions in conjunction with the wastewater flow rate may be utilized to increase the mass transfer coefficient and facilitate product $CO_2$ bubble removal by increased water velocity.

Product $CO_2$ gas removal may be achieved within the electrode compartment at gas-liquid separation elements (e.g. passive methods such as gravity, membrane separation) located at the end of anode segments.

The membrane or separator in the divided membrane cell has a high ionic conductivity for $H^+$ while preventing anion and minimizing cation crossover. The electrochemical cell also has a narrow inter-electrode gap which minimizes iR loss. In undivided cells, an inter-electrode gap is a few millimeters up to a few centimeters wide to allow the flow of wastewater between the electrodes, to prevent $H_2$ accumulating in the wastewater and contacting the anode, and to prevent $CO_2$ from accumulating in the wastewater. $H_2$ oxidation on the anode lowers oxidation efficiency and depolarizes the electrode while $CO_2$ blocks the catalyst surfaces of both electrodes lowering oxidation efficiency. For comparison, an undivided cell with a small inter-electrode gap of 5 mm, a wastewater of 2000 ppm TDS at a cell current density of 50 mA/cm$^2$ would have an iR$_{gap}$=0.8V. Conversely, with the same wastewater and current in a divided cell with a Nafion® membrane gap of 100 microns would have an iR$_{gap}$=0.005V.

TABLE 3

Electrode surface current density versus current density per unit cell volume

| # | COD (mg/L) | Anode surface area (m$^2$/m$^3$) | Mass transfer coefficient (m/s) | Current density on electrode surface (A/cm$^2$) | Current density per unit cell volume (A/cm$^3$) |
|---|---|---|---|---|---|
| 1 | 10,000 | 200 | 1 × 10$^{-4}$ | 0.882 | 1.411 |
| 2 | 10,000 | 200 | 1 × 10$^{-5}$ | 0.142 | 0.227 |
| 3 | 10,000 | 400 | 1 × 10$^{-5}$ | 0.134 | 0.429 |
| 4 | 500 | 6000 | 1 × 10$^{-5}$ | 0.001 | 0.259 |
| 5 | 500 | 6000 | 1 × 10$^{-4}$ | 0.002 | 0.507 |

The increase in surface area and/or mass transfer coefficient in this invention can be made with a continuous increase from anode inlet to outlet or by segmenting the electrode into 2 or more regions divided by 1 or more flow distributors, with different electrode substrate, pore network, catalyst coating, compartment dimensions, flow distributor, and mass and/or ionic transport promotors in each segment.

A small amount of catalyst phase that evolves some gas may be added to the anode catalyst layer or a functional coating on the anode face of the membrane/separator to increase mass transfer coefficient. For example, $IrO_2$ is used to evolve $O_2$ gas and/or $RuO_2$ to evolve $Cl_2$ gas. The additional benefit of adding $RuO_2$ is that the residual free chlorine concentration in the effluent will provide disinfection of the treated wastewater and the benefit of $O_2$ evolution is the additional oxidant in the wastewater, particularly for oxidizing metals such as iron and manganese.

Mass transfer is also increased in the anode and/or cathode compartment/unit cell by embossing walls and electrode Product $CO_2$ gas crossover to the cathode is prevented by the membrane in the divided cell so that solid, scaling carbonate precipitates do not form if any scaling cations (e.g. magnesium, calcium) are present. The solids that may form if these cations are present are soft and non-adherent (e.g. Ca(OH)$_2$, Mg(OH)$_2$) and their accumulation is prevented by intermittent or continuous flow through the cathode compartment. The separation of the cathode from the anode compartment also ensures that high purity $H_2$ gas which is non-flammable can be simply and safely discharged.

The divided membrane electrochemical cell also allows for improved operational efficiency through hydrodynamics including convective mass transfer, bubble and heat management to lower iR loss. The forced wastewater flow through the high surface area anode reduces the mass transfer and heat transfer boundary layers which enables rapid solid/liquid heat exchange and rapid COD delivery/$CO_2$ removal between the electrode surface and liquid wastewater. The flowing wastewater sweeps away product gas bubbles preventing bubble accumulation on the electrode surface. Additionally, the residence time is long enough to achieve complete oxidation in a single pass. The residence time is typically under 5 minutes.

Ionic and electronic voltage losses are reduced through the addition of ionic and electrically conductive phases to the anode and/or cathode electrode compartments.

In order to generate OH* radicals on all surfaces of the 3D electrode, the local voltage at all points on the anode active surface must be equal to or greater than the sum of the thermodynamic reaction voltage and anode overvoltage. Providing a uniform voltage distribution ensures all anode surfaces are at the same voltage, generating OH*, and contributing to a uniform current distribution. Anode and cathode electrode substrate/current collectors are designed to minimize current loss from buss bar feed to all points on electrodes. The 3D electrode substrate porous network has a low electrical resistivity, with the surface area and thickness designed for uniform voltage distribution through the length and width of electrode and good electrical charge transport between the electrode substrate base metal and the electrode/electrolyte interface.

Current collection connector points are strategically placed to limit the current path length and a minimum substrate cross-sectional area for current flow is utilized. For electrodes consisting of packed or fluidized bed of electro catalytic particles or fibers, current collector(s) are incorporated in the bed to minimize current loss. Dimpled or embossed surfaces on the current collector surfaces increase contact points and reduce contact resistance. The 3D anode substrate material must be corrosion resistant and electrochemically stable. 3D electrode substrates include one or more or combinations of expanded metal, mesh screen, sintered mesh, sintered random fiber mat, plate, particles, nonwovens and wovens. Suitable electrode substrate materials include electrically conductive metals, metal oxides, alloys, metal matrix composites, carbon, and graphite.

The electrode design is checked for voltage drop through the thickness of the electrode using the substrate material electrical resistivity, wastewater conductivity, bulk initial COD concentration, electrode surface area, wastewater flow velocity and mass transfer coefficient. Since the electrode substrate materials have a much higher conductivity than the wastewater, their resistance can be neglected. Conditions of high COD concentration, high surface area and low ion conductivity lead to voltage drop across the 3D electrode and loss of oxidation activity at locations where the voltage falls below the OH* oxidation potential. For a given set of process conditions (COD concentration, mass transfer coefficient, electrode surface area, flow velocity), the standard approach is to increase the cell voltage which increases the energy consumption and cost, and/or increase the wastewater conductivity by adding supporting electrolyte which adds cost and undesirable constituents. The voltage drop, $\Delta V$, through the thickness of the electrode is given by:

$$\Delta V = ZFkC_b A_e t^2/(2\sigma)$$

Where: t=electrode thickness
  $\sigma$=ion conductivity in the electrode

To demonstrate the advantages of the 3D electrode with ion conducting phases the following examples are shown below for a wastewater with low conductivity (800 $\Omega$-cm), COD concentration of 10,000 mg/L, a flow rate of 1 gph, and an anode compartment with a constant volume of 10 cm width, 5 mm height and 40 cm length. The ionic conductivity of the 3D electrode without ion conducting phase is equal to the wastewater conductivity. The ionic conductivity of the 3D anode with ion conducting phase is calculated using the Maxwell theoretical model for randomly distributed and non-interacting homogeneous spheres in a homogeneous continuous medium, with the ion conducting beads comprising the spheres and the wastewater the continuous medium. A reduction in the 3D anode potential drop and increase in the 3D anode ion conductivity of more than 60% is achieved.

| Ion Conducting phase | Mass transfer coefficient (m/s) | Electrode Surface Area $A_e$ ($m^2/m^3$) | Ion Conductivity in 3D electrode (S/m) | Voltage drop through thickness of electrode (V) |
|---|---|---|---|---|
| none | $4 \times 10^{-5}$ | 3000 | 0.1 | 1.8 |
| 50 volume % ion conducting beads (10 $\Omega$-cm) | $4 \times 10^{-5}$ | 3000 | 0.3 | 0.6 |

The 3D anode and cathode of this invention incorporate ion conducting solid phases that increase the electrode conductivity without impacting the wastewater composition. The concentration of solid ion conducting phase may be varied down the length and width of the electrode to match the reduction in COD concentration. Alternatively, ion conducting materials with different conductivities may be located along the length of the electrode, or a combination of both variable conductivities and concentration of ion conducting materials may be used. For example, ion conducting ceramics, proton conducting polymers, cation and anion ion exchange particles, beads, fibers, mats, nonwovens and/or ion selective ionomer coated glass beads, glass fiber mats or turbulence promotors.

In some embodiments the ion conducting materials are present in an amount of from 5 to 90 volume %. In some embodiments the ion conducting materials are present in an amount of from 15 to 85 volume %. In some embodiments the ion conducting materials are present in an amount of from 40 to 80 volume %.

The above regarding the ion conducting materials may also be allowed to the cathode.

Current distribution can be affected by local variations in the mass transport regime, conductivity of the wastewater, depletion of the reactant as well as by non-uniform voltage distribution. The ensure a uniform current distribution treating low conductivity wastewater, the addition of solid ion conducting phases in the 3D electrode network may be used to increase ion conductivity thereby increasing the penetration depth of the limiting current from the membrane face through the electrode thickness. For example, ion conducting ceramics, proton conducting polymers, cation and anion particles, beads, fibers, mats, nonwovens and ion selective ionomer coated glass beads, glass fiber mats and turbulence promotors. Particle diameters should be greater than 1 micron at a volume fraction greater than the percolation threshold and high aspect ratio fibers should have a diameter greater than 2 microns at a volume fraction of 15-20 volume percent. Liquid ion conducting phases such as salts, acids, or bases may be used if there are no effluent restrictions on the presence of these species in the treated wastewater.

If the 3D electrode thickness is greater than the limiting current penetration depth for the bulk COD concentration, the local current density outside of the penetration zone will be lower leading to poor current efficiency and lower performance. The penetration depth of limiting current is defined by:

$$P = \sqrt{(2e\sigma\eta)/(zFkC_b A_e)}$$

e=voltage of 3D electrode
η=overvoltage

To maintain full penetration depth along the length and width of the 3D electrode, applying an overvoltage to the anode (higher cell voltage) is generally used. This results in higher energy consumption and cost of treatment. This approach is not desirable for the 3D electrodes in the some embodiments of the invention because the limiting current penetration depth is not constant due to the variable mass transfer coefficients and surface areas within the electrodes.

In some embodiments, the active surface area of the electrode is increased along the length of the electrode from inlet to outlet proportionately to the depleted COD concentration as oxidation progresses and the amount of added solid ionomer phase along the length of the electrode is decreased.

In some embodiments, the 3D anode and cathode incorporate solid ion conducting phase(s) along the length and width of the electrode to raise the electrode conductivity and increase the limiting current penetration depth without the need to increase cell voltage or add supporting electrolyte to the wastewater. The concentration of solid ion conducting phase may be varied down the length of the electrode to match the reduction in COD concentration and local mass transfer coefficient and surface area variations. In some alternative embodiments, ion conducting materials with different conductivities may be located along the length of the electrode, or a combination of both variable conductivities and concentration of ion conducting materials may be used. For example, ion conducting ceramics, proton conducting polymers, cation and anion ion exchange particles, beads, fibers, mats, nonwovens and/or ion selective ionomer coated glass beads, glass fiber mats or turbulence promotors.

To demonstrate the advantages of the 3D electrode with ion conducting phases the following examples are shown for two wastewaters with a bulk COD concentration of 2000 mg/L and 200 mg/L, different mass transfer coefficients and surface areas, a flow rate of 1 gph, and an anode compartment with a constant volume of 10 cm wide, 5 mm height and 40 cm length.

The anode electrocatalyst is OH* reaction dominant. The electrode may be composed of a 3D array of catalyst particles and/or catalyst decorated particles of different shapes and sizes, an electro catalytic coating on a 3D substrate and/or their mixtures. The electrocatalyst/catalyst layer consists of a mixed metal oxide incorporating a new catalytic material $ZnSnO_3$ (>1 mol % ZnO) with a low kinetic activation energy for OH* generation. The catalyst/catalyst layer may also incorporate other catalytic materials possessing a low overpotential for OH* generation, high chemical and electrochemical stability such as $SnO_2$, n-type perovskites such as $BaSnO_3$ and $SrSnO_3$, and Sb, F, B, Nb, Bi doped $SnO_2$. These catalysts may be combined with one or more boron doped diamond and mixed metal oxides such as Ti, Ru, Ta, Co, Sb, Co, Zn, Nb, Ni, Pt, Pd and/or Rh oxide to provide durability and/or electrical conductivity.

The catalyst/catalyst layer may also incorporate a gas evolving catalyst phase to increase the mass transfer coefficient. Suitable oxygen evolving catalyst phases include $IrO_2$, platinum group metals and alloys, carbon, graphite and mixtures of these with mixed metal oxides such as Ti, Ru, Ta, Co, Sb, Co, Zn, Nb, Ni, Pt, Pd and/or Rh oxide.

The catalyst/catalyst layer may also incorporate a proton conductive phase such as a proton selective ionomer, and metal pyrophosphates: Sb or In doped $ZnP_2O_7$ to improve ion transport at the catalyst surface. For example, the conductivity of Nafion® is ~0.1 S/cm and In doped $ZnP_2O_7$ is ~0.02 S/cm whereas wastewater with a TDS of 5000 ppm equal to ~0.008 S/cm. An improvement of 12.5× using Nafion® and 2.5× using In doped $ZnP_2O_7$. Other ion conducting solids such as $SrZrO_3$, $SrRuO_3$, $SrTiO_3$ may also be incorporated.

The catalyst layer may be coated directly onto an electrically conductive substrate or onto a substrate containing 1 or more electrically conductive, barrier coating layers. The barrier layer should provide good electrical charge transport between base metal substrate and catalyst, a low ionic conductivity (prevents passage of aggressive anions in and dissolved substrate cations outward) and non-porous (prevents wastewater in). For example, the catalyst layer may be coated onto a mixed metal oxide ($RuO_2$ and/or $IrO_2$ based mixture) coated titanium 3D substrate.

The cathode compartment consists of a high surface area electrode to provide a high current density/unit volume and

| Ion Conducting phase | Bulk COD concentration (mg/L) | Ion conductivity of wastewater (S/m) | Ion Conductivity in 3D electrode (S/m) | Mass transfer coefficient (m/s) | Electrode Surface Area $A_e$ ($m^2/m^3$) | Penetration thickness of limiting current (mm) |
|---|---|---|---|---|---|---|
| none | 2000 | 1.5 | 1.5 | $2.5 \times 10^{-5}$ | 200 | 3.7 |
| 50 volume % ion conducting beads (10 Ω-cm) | 2000 | 1.5 | 2.9 | $2.5 \times 10^{-5}$ | 200 | 5.2 |
| none | 200 | 0.5 | 0.5 | $5 \times 10^{-6}$ | 3000 | 3.6 |
| 50 volume % ion conducting beads (10 Ω-cm) | 200 | 0.5 | 1.2 | $5 \times 10^{-6}$ | 3000 | 5.5 |

The results show that the presence of ion conducting solid phase in the 3D electrode improves the penetration depth of the limiting current. Both electrodes achieve limiting current through the full 5 mm of electrode thickness with the ion conducting solid phase. Without the ion conducting phase, the current efficiency and oxidation performance of the 3D electrodes is low.

enough open porosity to facilitate removal of evolved product $H_2$ gas and circulation of cleaning fluid. The cathode includes 1 or more flow distributors and/or flow channels for removing product $H_2$ gas and uniform flow distribution of gas-liquid fluids.

To improve ion conductivity in the 3D cathode, particularly when the catholyte is a side stream of low conductivity treated wastewater, solid ion conducting phase(s) along the length and width of the electrode to raise the electrode conductivity may be added. For example, ion conducting ceramics, proton conducting polymers, cation and anion ion exchange particles, beads, fibers, mats, nonwovens and/or ion selective ionomer coated glass beads, glass fiber mats or turbulence promotors.

To improve hardness tolerance of the cathode, carbon containing material and mixed resin beads may be added to the cathode compartment. The carbon containing material includes, for example, carbon particles, carbon felt, carbon paper, or carbon cloth. Preferably, carbon particles are located next to the membrane and electrically connected to the electrode to provide a negative charge on their surface.

The cathode electrocatalyst is $H_2$ reaction dominant. The electrocatalyst has a high chemical and electrochemical stability and may consist of catalyst particles and/or catalyst decorated particles of different shapes and sizes, an electro catalytic coating on an electrically conducting substrate and/or mixtures of these. The electrocatalyst/catalyst layer consists of one or more of Ni—Pt, Ni—Ru, Pd—Ni, Pd—Ag, Pt—Ru, Pt—Rh, Raney nickel doped with Pt &/or Pd, Cu-doped ZnO, Ru, $RuO_2$, Ni—Mo and $RuO_2$, Pt, Pd, Pb, Zn, Fe, Pd—Sn, Pd—In, Cu, CuZn, CuNi, Ag, Rh, Ru, RhS, Pt, CoTMMP and their alloys and mixtures.

The catalyst/catalyst layer may also incorporate a proton conductive phase such as a proton selective ionomer to improve ion transport at the catalyst surface.

The catalyst/catalyst layer may also incorporate a $H_2O_2$ scavenger or decomposition catalyst for durability such as $MnO_2$ ($H_2O_2$ formation is a parasitic reaction on the cathode).

The cathode catalyst layer may be coated directly onto an electrically conductive substrate or onto a substrate containing 1 or more electrically conductive, barrier coating layers. The barrier layer should provide good electrical charge transport between base metal substrate and catalyst, a low ionic conductivity and non-porous. For example, the catalyst layer may be coated onto a nickel mesh substrate coated with a Pd protection zone.

The cathode electrode may incorporate sites for preferential nucleation of hydrogen bubbles in the open porosity region of the electrode. These sites may be formed by deposition of hydrophobic phases such as PTFE, changes in the electrode surface roughness and/or surface wettability. To avoid gas trapping in the electrode and reaction efficiency reduction, perforations should be greater than 0.1 mm.

The cathode substrate material must have good electrical conductivity to provide for uniform voltage and current distribution, corrosion resistance and electrochemical stability. The substrate may include one or more or combinations of expanded metal, mesh screen, sintered mesh, sintered random fiber mat, plate, particles, nonwovens and wovens. Suitable electrode substrate materials include electrically conductive metals and their alloys, metal oxides, metal matrix composites, carbon, and graphite.

The membrane/separator conducts protons while acting as an electronic insulator and a reactant & gas barrier. The membrane has a small thickness to reduce the electrode gap ($iR_{gap}$ loss), typically 50-300 microns, preferably 50-150 microns. Suitable $H^+$ ion selective membranes include PFSA type membranes (e.g. Nafion®, Aquivion®, Flemion®, Aciplex®, Gore-Select®). Suitable separators include battery separator coated/impregnated with ionomer, glass fiber mat coated/impregnated with ionomer. The ionomer and membranes are chemically stabilized and can be reinforced with porous substrates (e.g. ePTFE, glass fiber) to provide mechanical stability.

The membrane/separator is coated on the anode face and cathode face with functional coatings to provide durability and enhance oxidation efficiency. Functional coatings on the anode face of the membrane/separator may include one or more of hydrophilic phases to detach bubbles (such as $SnO_2$ and/or $ZrO_2$ particles), hard particles for erosion protection (such as $TiO_2$ and $SnO_2$), mixed proton and electron conductive phases to distribute current and prevent hot spots (such as ionomer and/or proton conducting solids including metal pyrophosphates, $SrZrO_3$, $SrRuO_3$, $SrTiO_3$, $SnP_2O_7$, $SnP_2O_7$ doped with other metals such as $In^{3+}$, Sb, ZnO with electron conducting solids including $IrO_2$, $RuO_2$, $ZnSnO_3$, Nb doped $TiO_2$, stabilized $Ti_4O_7$, doped $Ti_4O_7$, $SnO_2$, doped $SnO_2$), OH* chemical scavenger phases to prevent OH* attack of membrane (such as $MnO_2$), oxygen generation catalyst phases to oxidize metal ions to prevent membrane fouling (such as $IrO_2$, $RuO_2$, platinum group metals and alloys), and/or OH* generation catalyst phases to oxidize pollutants to prevent membrane fouling (such as Sb, F, B, Nb, Bi, Ni, Mn, Co doped $SnO_2$ and/or $ZnSnO_3$ (>1 mol % ZnO), combined with one or more mixed metal oxides: Ti, Ir, Ru, Ta, Co, Sn, Sb, Co, Zn, Nb, Ni, Pt, Pd, Rh, Ce, Mn, Cu, or n-type perovskites: $BaSnO_3$, $SrSnO_3$, doped $TiO_2$, stabilized $Ti_4O_7$, or doped $Ti_4O_7$). The phases may be mixed, different composition along the length of the electrode or through the thickness.

Functional coatings on the cathode face of the membrane/separator may include one or more of hard coating particles for erosion protection (such as nitrides, carbides, metals, alloys, graphite, carbon), inert or catalytically active structural support for thin membranes (such as particles, whiskers, fibers of metals, nitrides, carbides, borides, graphite, carbon, chemically stable plastic), mixed proton and electron conductive phases to distribute current and prevent hot spots (such as ionomer with electron conducting solids including metals, graphite, carbon, nitrides, carbides, borides), and cation scavenging phases to collect cations and prevent their accumulation or deposition on catalyst sites and formation of scaling solids (such as activated carbon particles). The phases may be mixed, different compositions along the length of the electrode or through the thickness.

For wastewaters containing COD inorganics such as $NH_3$, $H_2S$, metals and/or organic species with low oxidation potentials such as methanol, the anode compartment may incorporate a pre-treatment segment with a non-OH* catalyst composition and/or a low applied voltage to lower the energy consumption and associated operating costs of COD decomposition. The anode thermodynamic half-cell reactions and voltages for ammonia oxidation by OH* and the decomposition of ammonia by electro-oxidation in alkaline wastewater are 2.32V and −0.77V respectively.

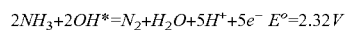

$2NH_3+2OH^*=N_2+H_2O+5H^++5e^-$  $E°=2.32V$

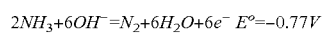

$2NH_3+6OH^-=N_2+6H_2O+6e^-$  $E°=-0.77V$

When ammonia decomposition is catalyzed by a platinum-based catalyst, the anode half-cell voltage ($E°+\eta$) for decomposition is on the order of 0.4-0.7V. Conversely, when decomposition is by reaction with OH* using a doped $SnO_2$ based catalyst, the anode half-cell voltage ($E°+\eta$) is on the order of 2.7-2.8V. By incorporating a pre-treatment segment in the anode with a platinum or nickel-based catalyst at 0.7V, a saving of 75% in energy consumption decomposing these compounds is realized.

Similarly, for methanol in alkaline wastewater, the anode half-cell voltage $E°=0.043V$ and platinum based catalysts are equally effective. Applying low voltages may result in partial oxidation of some organic compounds in the wastewater that deposit on the catalyst surfaces. To clean, voltage pulses or applying a voltage high enough to evolve oxygen gas ($E°=1.2V$) may be used alone or in combination with the chemical cleaning methods effective for all anode segments.

Suitable decomposition catalysts for low oxidation potential compounds include platinum group metals and alloys, nickel metals and alloys, metal oxides and mixtures of these such as Pt—Ir, Pt black, Pt—Rh, Pd—Rh, Ni—Co oxides, Ir—Ta oxides, magneli phase sub-oxides of titanium, carbon and graphite.

For large volumetric flows of wastewater, the electrodes/unit cells may be scaled in width and height. Unit cells may be assembled into multiple monopolar units which are sub-divided into voltage steps in order to limit size and cost of the power supply. Unit cells may also be assembled at electrically separate units. The buss bar and current distribution system may be designed with the ability to short circuit 2 adjacent cells to repair or replace a cell without shutting down the process.

The Cathode may be cleaned in any of the following ways:
1. Aggressive cleaning procedure—Intermittent flush with chelating agents NTA, EDTA; citric acid, citrates chelating softener, oxalic acid.
2. Reverse cell polarity while feeding a side-stream of treated anode effluent.
3. Short out cathode while feeding a side-stream of treated anode effluent.
4. Prevent fouling—continuous flow of a side-stream feed of treated anode effluent (flow>0.1 m3/hr/m2).

The Anode may be cleaned in any of the following ways:
1. Voltage pulse to remove deposits of any partial oxidation products and/or reaction product bubble accumulation.
2. Sodium sulfite (pH 8-12, 70° C.) or ferrous sulfate wash in case of $MnO_2$ deposits.
3. Backwash particulate accumulation by reversing the wastewater flow so that the treated, clean wastewater flows through the anode compartment, by-passes the filter if present, and discharges into the wastewater tank.

DETAILED DESCRIPTION OF DRAWINGS

Figure 1:
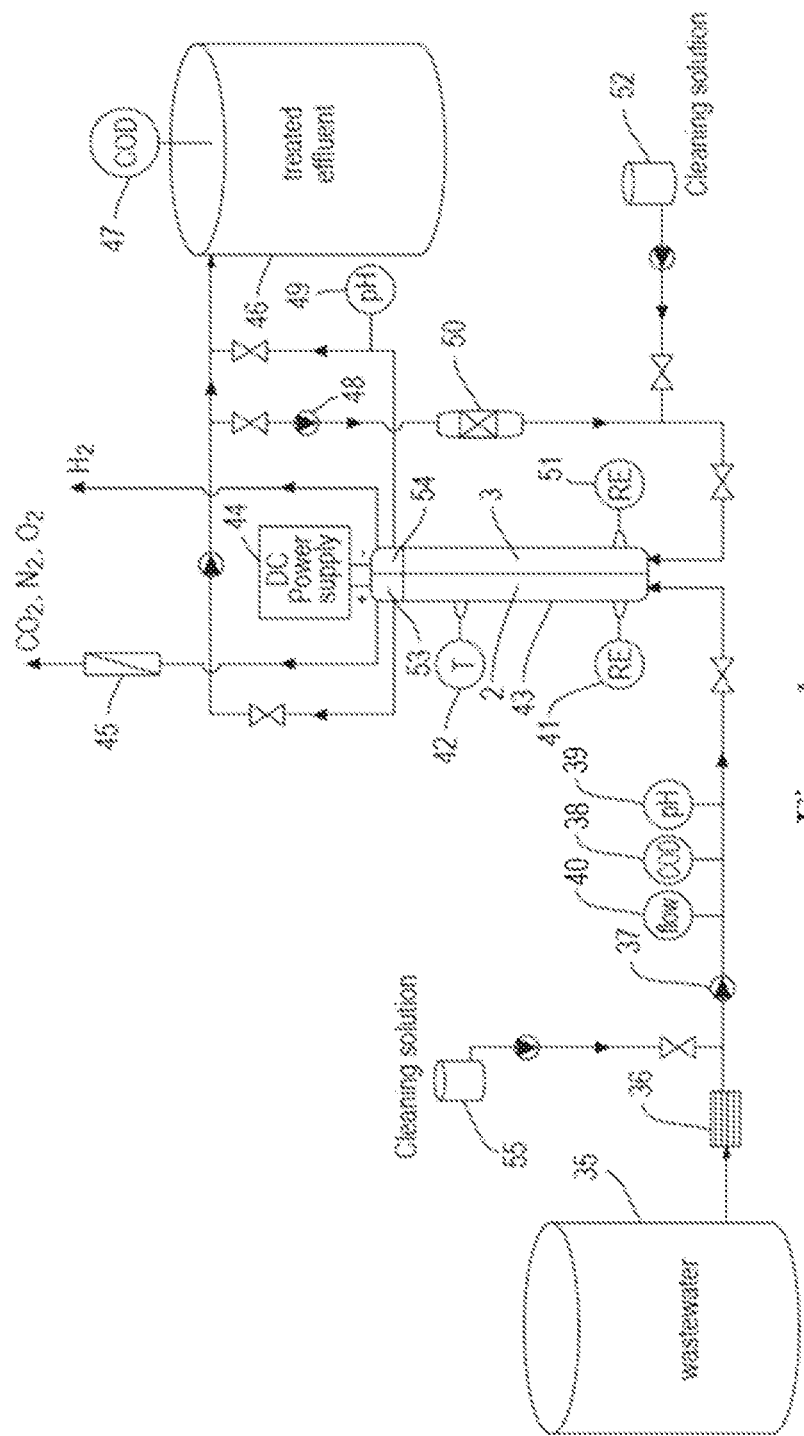
FIG. 1 is a schematic view of a wastewater electrochemical treatment system.

FIG. 1 is a schematic view of a wastewater electrochemical treatment system configured in accordance with the present invention. Wastewater from a source, such as an equalization tank 35, is pumped 37 to the electrochemical oxidation vessel 43. The wastewater optionally passes through a filter unit 36 when the TSS of the wastewater contains large particle larger than the smallest anode perforation or a high volume fraction of particles, greater than 5%, to prevent electrode clogging or shielding of activation sites. For monitoring and control purposes, COD 38 and pH 39 are monitored to detect any upset conditions and a flow meter 40 measures the flow rate. The flow rate may be increased or decreased automatically by adjusting the pump speed depending on the treatment objective and variations in measured COD concentration. The wastewater is fed into the cell vessel 43, passing through the anode compartment 2 or an array of anode compartments. A thermometer or thermocouple 42 measures the wastewater cell temperature for monitoring and control purposes. A power supply or potentiostat 44 applies a DC cell voltage across the anode-cathode pair(s) to provide an anode half-cell voltage large enough to produce OH*. The anode voltage at a point farthest from the bussbar feeder is measured by a reference electrode(s) 41 and this value is fed back to the power supply or potentiostat 44 for control of the applied cell voltage. The treated effluent and product gas ($CO_2$, $N_2$, $O_2$) exits the anode compartment to a liquid-gas separator 53. The treated effluent is directed to discharge or a tank 46 where the COD 47 is measured to confirm the treatment objective. The anode product gas is passed through a scrubber 45, such as a carbon cartridge, to remove any fugitive volatile gases and then vented to atmosphere. A small side-stream of treated effluent is either continuously or intermittently pumped 48 through the cathode compartment 3 or array of cathode compartments. If a copious amount of scale forming ions are present in the treated effluent, the effluent may optionally pass through a pre-treatment unit 50, such as electro-deionization, capacitive deionization or ion exchange resin, to remove them. The cathode water and product $H_2$ gas exit the cathode compartment to a liquid-gas separator 54. The $H_2$ gas may be captured for use as an energy carrier, vented or flared to atmosphere and the cathode water is discharged back into the treated effluent. A sensor 49 measures the pH for monitoring and control purposes. Optional cleaning solutions stored in a small vessel 52 for cathode clean-in-place may be circulated to the cathode compartment in the cathode water. Optional cleaning solutions stored in a small vessel 55 for anode clean-in-place may be circulated to the anode compartment. If particulate deposits accumulate in the anode, the electrode may be back-flushed by reversing the flow of wastewater, by-passing the filter, to the wastewater feed.

Figure 2:
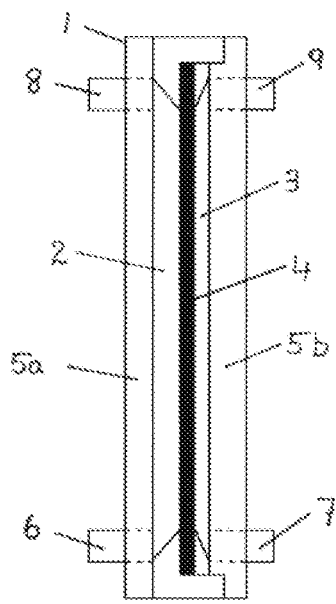
FIG. 2 is an exterior side-view of an exemplary anode-cathode cell.

FIG. 2 is an exterior side-view of an exemplary anode-cathode cell 1. In FIG. 2, the anode compartment 2 is divided from the cathode compartment 3 by the membrane/separator 4. The membrane is composed of proton selective conducting ionomer, such as Nafion®.

The anode and cathode compartments 2, 3 are enclosed in a cell housing 5a, 5b made of electrically insulating materials to prevent stray current loses. Suitable materials include polymers, glass, fiberglass reinforced plastic, ceramics, and polymer coated metals. The wastewater is fed into the anode compartment through the anode inlet 6 and the treated effluent and product gas ($CO_2$, $N_2$, $O_2$) exit at the anode outlet 8. A side-stream of treated effluent is fed to the cathode compartment through the cathode inlet 7 and the cathode water and product $H_2$ gas exit at the cathode outlet 9.

Figure 3:
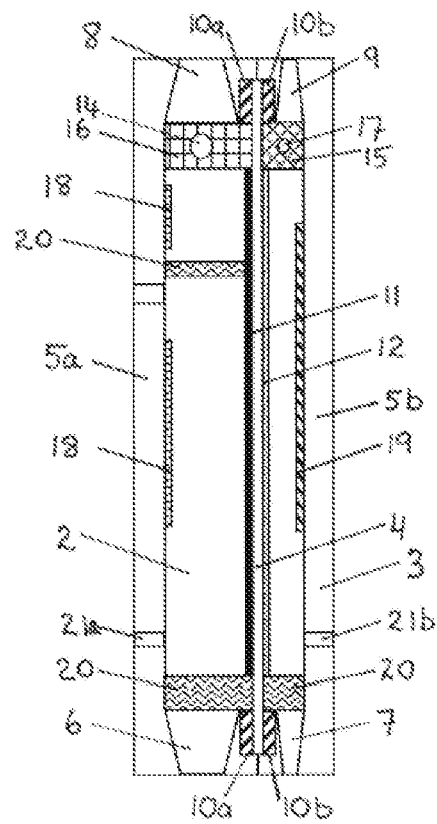
FIG. 3 is an interior side-view of an exemplary anode-cathode cell.

FIG. 3 is an interior side-view of an exemplary anode-cathode cell. The exterior cell housing 5a, 5b keeps the cell liquid and gas tight, and is insulating to prevent any leakage current. The anode compartment is enclosed in the housing 5a and the cathode compartment is enclosed in an insulating housing 5b. 3 by the membrane/separator 4. The cell is sealed by gaskets 10 located between the membrane The cell is sealed by gaskets 10a 10b located between the membrane 4 and housing 5a, 5b. The membrane is composed of proton selective conducting ionomer. An anode functional coating 11 is located on the anode face of the membrane 4. The anode functional coating provides durability and enhances oxidation efficiency. The coatings may include one or more of particles to detach bubbles such as $ZrO_2$ and $TiO_2$, hard particles for erosion protection such as $TiO_2$ and $SnO_2$, mixed proton and electron conducting phases to distribute current such as ionomer, and doped $SnP_2O_7$, OH* scavenger such as $MnO_2$ particles to protect membrane from OH* attack, and/or oxygen catalyst particles to oxidize metal ions and prevent membrane fouling. The phases may be mixed, and possess different composition along the length of the membrane or through the coating thickness. The wastewater is fed to the anode compartment 2 through the anode inlet 6 and flow distributor 20. The anode inlet and flow distributor are electrically insulating materials to prevent stray current loss. The flow distributor 20 is composed of a series of parallel or horizontal slots, and/or beads to provide uniform liquid distribution for high mass transfer efficiency. The wastewater flows through the 3D electrode which is located in the anode compartment 2. The organic and inorganic compounds in the wastewater are oxidized by OH* radicals generated on the surface of the 3D electrode as the wastewater flows through the anode. The anode voltage is applied to the electrode via the current collector 18. The anode half-cell voltage is measured and fed-back to the power supply by the reference electrode through the reference voltage port 21a. The treated effluent and product gas ($CO_2$, $N_2$, $O_2$) exit the anode compartment 2 into the anode gas-liquid separator 16. The effluent exits the liquid-gas separator 16 through the anode liquid outlet 8 and the product gas exits through the anode gas vent 14. The anode liquid-gas separator 15, anode liquid outlet 9 and anode gas vent 17 are all composed of insulating materials to prevent stray current loss.

The side-stream of treated effluent is fed to the cathode compartment 3 through the cathode inlet 7 and a flow distributor 20. Similarly, both the cathode inlet and flow distributor are electrically insulating materials to prevent stray current loss. The cathode electrode is a high surface area electrode located in the cathode compartment 3 and possesses enough porosity to prevent $H_2$ gas accumulation and to enable cathode water/cleaning fluid flow through the cathode compartment 3. The cathode voltage is applied to the electrode via the current collector 19. The cathode half-cell voltage is measured by the reference electrode 51 through the reference voltage port 21b. A cathode functional coating is located on the cathode face of the membrane 12. The cathode functional coating provides erosion protection and enhances oxidation efficiency. The coating may contain one or more of hard particles for erosion protection such as carbides and metals, structural support for thin membrane such as fibers, cation scavengers to prevent their blocking catalyst sites such as activated carbon particles and mixed proton and electron conductive phases to distribute current such as ionomer and graphite. The particles may be mixed, possess different compositions along length of the cathode and/or through the coating thickness. The cathode water/cleaning fluid flows through the cathode compartment 3. The cathode water and product $H_2$ gas exit the cathode compartment 3 into the cathode gas-liquid separator 15. The cathode water exits the liquid-gas separator 15 through the cathode liquid outlet 9 and the product $H_2$ gas exits through the cathode gas vent 17. The cathode liquid-gas separator 15, cathode liquid outlet 9 and cathode gas vent 17 are all composed of insulating materials to prevent stray current loss.

Figure 4:
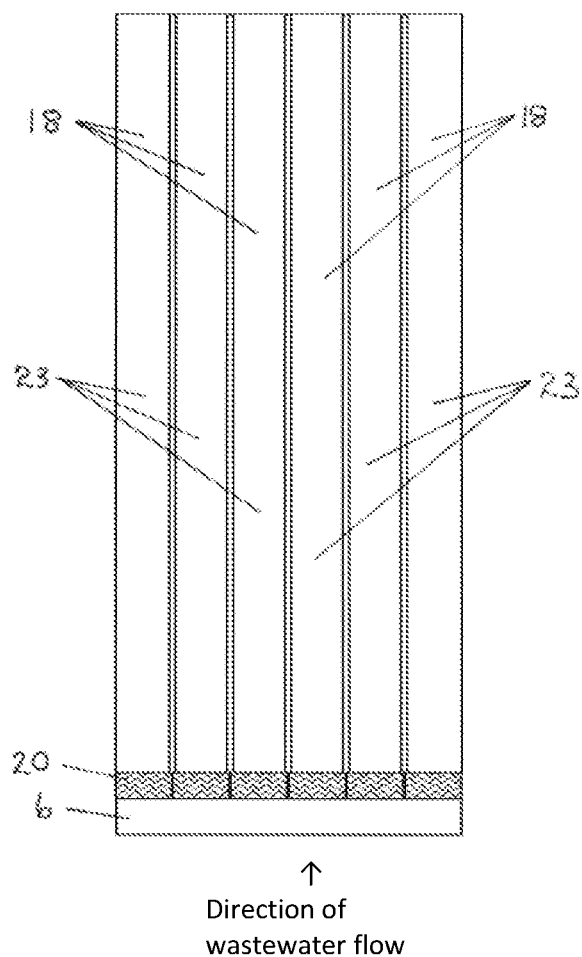
FIG. 4 is a planar view of an exemplary divided anode compartment.

FIG. 4 is a planar view of an exemplary divided anode compartment. For large volumetric flows, scaling up the size of the anode-cathode cells is cost effective. The divided anode compartment has a common wastewater feed inlet, header 6. The flow distribution is accomplished either by a series of individual flow distributors 20, as shown, or one large distributor across the width. The compartment may be divided by machining grooves in the anode housing 5a to accommodate a set of 3D electrodes and provide mechanical support for the membrane. Alternatively, a large anode compartment is occupied by one 3D electrode that is divided by a series of current collectors 18 that run the length of the anode compartment and provide barriers across the width of the anode and anode compartment subdivisions 23. Mechanical support for the membrane is then provided by the current collectors 18. The cathode compartment is constructed in a similar manner so that the mechanical supports of the cathode and anode match. The electrode length is increased to provide for higher volumetric flows and the configuration of the 3D electrode is designed so that the product of mass transfer coefficient and electrode surface area ($kA_s$) is maximized along the length of the electrode. One or more flow distributors 20 may be incorporated along the length of each anode compartment subdivisions 23.

Figure 5:
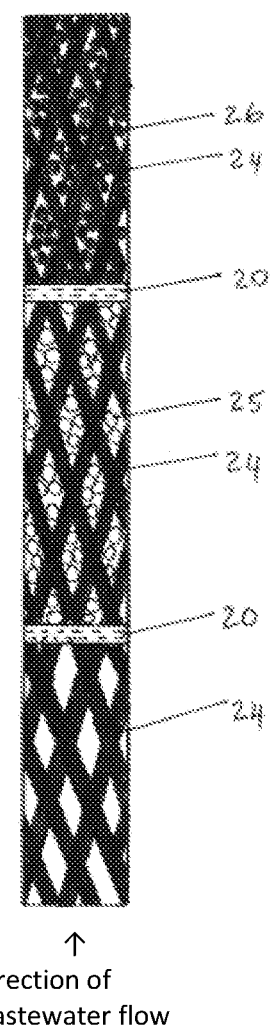
FIG. 5. is a planar view of an exemplary 3D anode electrode configuration designed for high COD wastewater.

FIG. 5. is a planar view of an exemplary 3D anode electrode configuration designed for high COD wastewater. The embodiment shown is suitable for greater than 10,000 mg/L COD, with a TDS greater than 5000 ppm. The electrode is divided into three segments along its length by two flow distributors 20 in the direction of wastewater flow. The first segment of the 3D electrode is composed of a stack of expanded metal substrates coated with OH* catalyst layers 24. The stack thickness is specified based on COD concentration, wastewater flow rate, surface area $A_s$ and mass transfer coefficient k of the segment, maximum cell current and projected current density, volume of product gas produced, limiting current penetration depth and sum of iR losses at the operating current. The second segment of the 3D electrode is composed of a stack of the same expanded metal substrates coated with OH* catalyst layers 24 with interspersed inert glass beads 25 as turbulence promotors. The electrode surface area is the same as segment one, The glass beads 25 increase the mass transfer coefficient k of the segment to accommodate the reduction in the bulk COD leaving segment one and maintain a uniform limiting current and projected current density. The final electrode segment is composed of a stack of expanded metal substrates coated with OH* catalyst layers 24 interspersed with OH*catalyst particles 26. The presence of the catalyst particles 26 increase both the surface area $A_s$ and the mass transfer coefficient k of the segment to accommodate the further reduction in bulk COD leaving segment two and maintain a uniform limiting current and projected current density.

Figure 6:
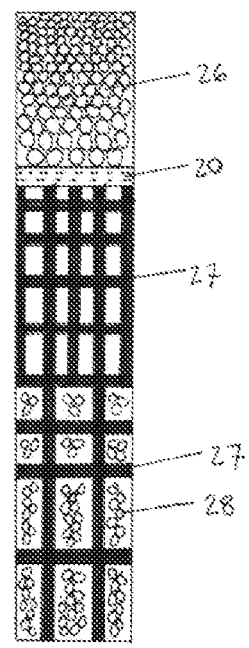
FIG. 6. is a planar view of an exemplary 3D anode electrode configuration.

FIG. 6. is a planar view of an exemplary 3D anode electrode configuration. The embodiment shows is suitable for low conductivity wastewater, less than 5000 ppm TDS. The 3D electrode is segmented into three regions with one flow distributor 20. The first electrode segment is composed of a stack of metal mesh substrates coated with OH* catalyst layer 27 interspersed with ion/proton conducting particles 28. The volume fraction of ion conducting particles is specified based on the value of the wastewater conductivity and the required limiting current penetration depth. For low penetration depths, a smaller stack of mesh substrates is used but a higher surface area mesh may be used to compensate for the loss in surface area $A_s$. The second segment is composed of a higher surface area stack of mesh substrates coated with OH* catalyst layer 27. Since the limiting current penetration depth increases with decreasing COD concentration so the subsequent segment does not require an increase in conductivity to maintain the same penetration depth thus, ion conducting particles are not present. The higher surface area of the second segment is designed to match the limiting current of the first segment for the reduced COD. The final segment is composed of a bed of OH* catalyst particles 26 with a higher surface area than the second and first segments to maintain a constant limiting current.

Figure 7:
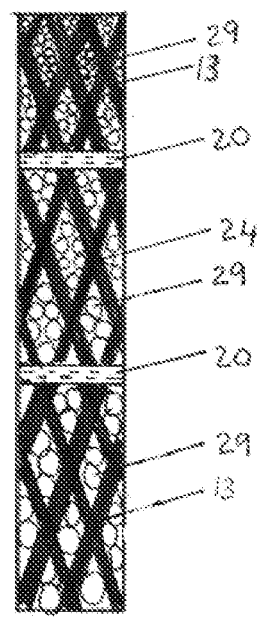
FIG. 7. is a planar view of an exemplary 3D anode electrode configuration.

FIG. 7. is a planar view of an exemplary 3D anode electrode configuration. The embodiment shown includes a high electrode surface area provided by particles 29 consisting of mixed catalyst and proton conducting solid phases. The electrode is divided into three segments by two optional flow distributors 20. Expanded metal current collector(s) 13 are situated within the bed of agglomerate particles 29 to reduce its iR loss. The surface of the current collector 13 may be textured to increase surface roughness to improve electrical contact with the particles. To maintain a constant limiting current over the electrode, the size of the particles 29 are reduced down the length of the electrode in the direction of wastewater flow to increase surface area $A_s$ and mass transfer coefficient k as COD concentration is reduced.

Figure 8:
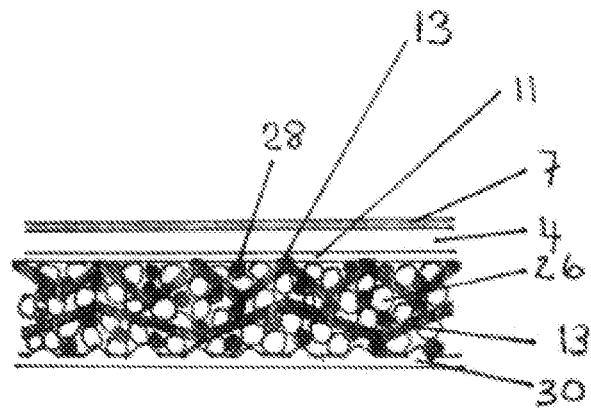
FIG. 8. is a cross section view of a section of an exemplary 3D anode electrode configuration FIG. 9. is a planar view of an exemplary 3D electrode with a pre-treatment segment for inorganic electrochemical decomposition.

FIG. 8. is a cross section view of a section of an exemplary 3D anode electrode configuration. The embodiment shown includes a high electrode surface area provided by a mixture of discreet catalyst particles 26 and solid ionomer particles 28. Two expanded metal current collectors 13 are located within the bed of particles, aligned perpendicular to each other. The current collector closest to the membrane is flattened on the surface facing the membrane 4 to provide mechanical support and prevent perforation of the thin membrane 4. The anode and cathode functional coatings 11, 12 are shown on the membrane 4. The anode functional coating 11 prevents membrane degradation by preventing the direct contact of the membrane with the active catalyst particles 26 and current collector 13. The anode compartment wall 30 is shown with embossed dimples that improve mass transfer.

Figure 9:
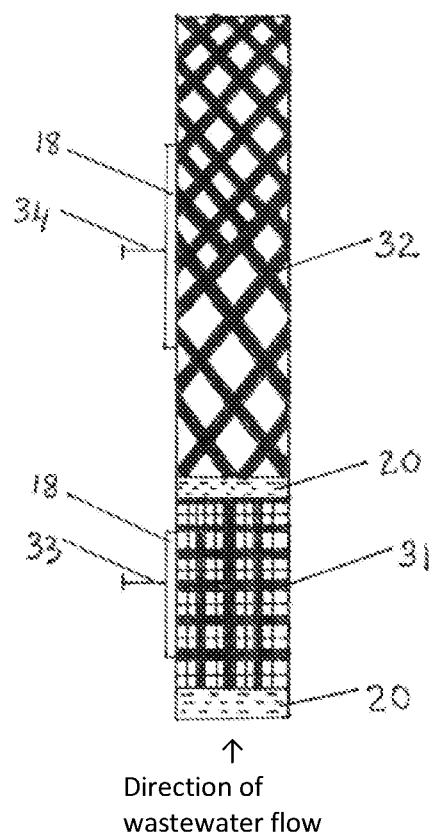

FIG. 9. is a planar view of an exemplary 3D electrode with a pre-treatment segment 31 for inorganic electrochemical decomposition. The pre-treatment segment 31 consists of a porous substrate coated with a $H_2S$, $NH_3$ and/or metal oxidation catalyst and a voltage tab 33 which provides a lower anode half-cell voltage to the segment. An flow distributor 20 provides electrical separation and flow distribution into the subsequent segment 32. The subsequent segment 32 consists of a porous substrate with increasing surface area $A_s$ in the direction of flow that is coated with an OH* catalyst and a voltage tab 34 which provides a higher anode half-cell voltage to the segment.

In some embodiments, there are at least 2 voltage tabs 34. In some embodiments there are 2-3 voltage tabs 34. In some embodiments the voltage tabs are separated by at least one insulating flow distributor 20.

Further Examples and Experimental Data

A divided, flow-through reactor with anode and cathode compartments of 10 cm wide×40 cm high×6.4 mm thick was fabricated from PVDF. The inlet ports were at the bottom of the cell and flow distributors consisting of a series of parallel channels, 3 mm wide×4 mm long, were located at the entrance to both anode and cathode compartments. A proton selective membrane, Nafion 117™, divided the cell. The cell was sealed using silicone gaskets and a port for the reference electrode was located 1 cm above the anode flow distributor. In all experiments, the wastewater was fed to the anode compartment at room temperature and at a pH of 7. A constant cell voltage of 8 volts was applied, and only a single pass of the wastewater through the anode was used in all experiments. This translates into a treatment time of less than 4 minutes and 8 minutes for flow rates of 4 L/hr and 1.9 L/hr respectively. Samples of treated wastewater were taken after the oxidation process had run at steady state for at least 30-60 minutes. Wastewater analysis for COD and phenol concentrations were measured according to USEPA methods 410.4 and 420.1 respectively.

Set 1

Treatment of wastewater was performed in the divided reactor at a constant cell voltage of 8V. The wastewater was composed of 500 mg/L phenol (COD=1200 mg/L) in a solution of 8 g/L $Na_2SO_4$, that was fed to the anode compartment at either 4 or 1.9 liters/hour in a single pass. The catholyte was a solution of 8 g/L $Na_2SO_4$ that was recirculated through the cathode compartment during all experiments. The same 3D cathode with a constant mass transfer coefficient and constant surface area was used in all experiments. The cathode was a stack of two commercial mixed metal oxide (MMO) expanded metal cathodes (Magneto Special Anodes BV) with an effective surface area of 205 m/$m^3$. The anodes in Examples 1, 2 and 4 consisted of 3D electrodes with constant mass transfer coefficient and constant surface area along their width and length. The anodes in Examples 1 and 4 are a stack of 3 commercial MMO expanded metal anodes (Magneto Special Anodes BV) occupying the full length of 40 cm of the anode compartment with an effective surface area of 410 $m^2/m^3$. Example 2 anode was a stack of 2 commercial MMO expanded metal anodes (Magneto Special Anodes BV) with an effective surface area of 205 $m^2/m^3$. Examples 3 and 5 anodes consist of 3D electrodes with variable mass transfer coefficient and variable surface area. The first 30 cm of anode length is a stack of 2 commercial MMO expanded metal anodes (Magneto Special Anodes BV) with an effective surface area of 205 $m^2/m^3$. The final 10 cm of the anode length consists of a loose random packing of sintered antimony doped tin oxide particles (Stannex ELR™), and current collection provided by 2 MMO expanded metal screens. The surface area of the bed of particles was estimated as 1272 $m^2/m^3$ from the particle size distribution assuming spherical shapes.

Results

The mass transfer coefficient was determined for each segment of the 3D electrodes using the well-known mass transfer correlations for a stack of expanded metal sheets and for a porous electrode with the kinematic viscosity of phenol=$8\times10^{-7}$ $m^2$/s and the molecular diffusion coefficient of phenol in water=$8.47\times10^{-10}$ $m^2$/s. The correlation for a stack of expanded metal sheets is defined as:

$Sh=0.71Re^{0.54}Sc^{0.33}(R_h/\alpha)^{0.38}$ and the correlation for a porous electrode is defined as: $eSt=0.45Re^{-0.41}Sc^{-0.67}$ where: $Sh$=Sherwood number, $Re$=Reynolds number, $Sc$=Schmidt number, $R_h$=hydraulic radius and $\alpha$=aperture radius in direction of flow.

Mass Transfer Coefficients for 3D Electrode Segments

| Description | Wastewater flow rate (L/hr) | Mass Transfer Coefficient (m/s) |
|---|---|---|
| Stack of 3 MMO expanded metal anode sheets | 4 | $6.29 \times 10^{-6}$ |
| | 1.9 | $4.21 \times 10^{-6}$ |
| Stack of 2 MMO expanded metal sheets | 4 | $7.58 \times 10^{-6}$ |
| | 1.9 | $4.39 \times 10^{-6}$ |
| Loosely packed bed of Stannex ELR ™ particles | 4 | $5.11 \times 10^{-6}$ |
| | 1.9 | $3.3 \times 10^{-6}$ |

The limiting current at the front and at a point ¾ along the length of the 3D electrodes are shown below. Examples 3 and 5 with variable mass transfer coefficient and variable effective surface area have a uniform limiting current along the length of the electrode. Examples 1, 2 and 4 with a constant mass transfer coefficient and surface area have a drop in the limiting current of 3 to more than 4 times at ¾ point along the electrode length. This non-uniform current distribution leads to reduced oxidation efficiency at the lower limiting current regions and higher rates of anode degradation at the higher current regions shortening the lifetime of the electrode.

Limiting Current for 3D Electrodes

| Example # | 3D Electrode Description | Wastewater flow rate (Lit/hr) | Limiting Current at front end of electrode (A) | Limiting Current at ¾ point along length (A) |
|---|---|---|---|---|
| 1 | Stack of 3 MMO expanded metal anode sheets | 4 | 5.7 | 1.4 |
| 2 | Stack of 2 MMO expanded metal sheets | 4 | 3.8 | 1.0 |
| 3 | Stack of 2 MMO expanded metal sheets and loosely packed bed of Stannex ™ particles | 4 | 3.8 | 3.8 |
| 4 | Stack of 3 MMO expanded metal sheets | 1.9 | 3.5 | 0.8 |
| 5 | Stack of 2 MMO expanded metal sheets and loosely packed bed of Stannex ™ particles | 1.9 | 2.1 | 2.1 |

The predicted COD, measured COD, phenol removal percentages and energy consumption are shown below. Examples 3 and 5 with variable mass transfer coefficient and surface area are the most energy efficient having the lowest energy consumption per kg COD destroyed. Notably, Example 5 achieved a 25% higher COD removal than predicted. Comparing Examples 2 and 3, the addition of the higher surface area particle bed in the last ¼ segment of the electrode increased the destruction of COD by 40% and phenol by 60%, while reducing the energy consumption by 40%.

COD Destruction and Energy Consumption

| Example # | Wastewater flow rate (Lit/hr) | Predicted % COD destruction | Measured COD destruction (%) | Measured phenol destruction (%) | Energy Consumption (kWh/m³) |
|---|---|---|---|---|---|
| 1 | 4 | 45 | 27 | 50 | 162 |
| 2 | 4 | 31 | 20 | 25 | 60 |
| 3 | 4 | 47 | 35 | 40 | 36 |
| 4 | 1.9 | 57 | 53 | 85 | 337 |
| 5 | 1.9 | 58 | 73 | 80 | 147 |

Set 2.

Treatment of low conductivity wastewater was performed in the divided reactor at a constant cell voltage of 8V with 3D anodes and cathodes with and without ion conducting phases. The anode overpotential of 1 volt was measured using the reference electrode. The low conductivity wastewater was composed of 500 mg/L phenol (COD=1200 mg/L) in a solution of 1 g/L $Na_2SO_4$, pH=7 at room temperature, that was fed to the anode compartment at 4 liters/hour in a single pass. The resistivity of the wastewater and properties of the ion conducting phases are shown below.

Properties of Ion Conducting Phases and Wastewater

|  | Conductivity (S/m) | Particle size |
|---|---|---|
| LiquGen ™ cation exchange resin beads | 2.78 | Effective: 0.4-0.6 mm |
| Nafion ™ NR50 beads | 10 | 3-4 mm |
| 1 g/L $Na_2SO_4$ solution or wastewater | 0.16 | n/a |
| 8 g/L $Na_2SO_4$ wastewater | 1.25 | n/a |

Example 6 without an ion conducting phase consisted of a 3D anode with variable mass transfer coefficient and variable surface area. The first 30 cm of anode length is a stack of 2 commercial MMO expanded metal anodes (Magneto Special Anode BV) with an effective surface area of 205 $m^2/m^3$. The final 10 cm of the anode length consists of a loose random packing of sintered antimony doped tin oxide particles (Stannex ELR™), and current collection provided by 2 MMO expanded metal screens. The surface area of the bed of particles was estimated as 1272 $m^2/m^3$ from the particle size distribution assuming spherical shapes. The 3D cathode was a stack of three commercial MMO expanded metal cathodes (Magneto Special Anode BV) with an effective surface area of 410 $m^2/m^3$. The catholyte was a low conductivity solution of 1 g/L $Na_2SO_4$ recirculated through the cathode compartment.

Example 7 with conducting ion phases consisted of a 3D anode with variable mass transfer coefficient and variable surface area. The first 30 cm of anode length is a stack of 2 commercial MMO expanded metal anodes (Magneto Special Anode BV) with an effective surface area of 205 $m^2/m^3$ and 50 volume % of cation exchange beads (LiquGen™) occupying the compartment volume. The final 10 cm of the anode length consisted of a loose random packing of sintered antimony doped tin oxide particles (Stannex ELR™) mixed with proton selective ionomer beads (Nafion™ NR50), and current collection provided by 2 MMO expanded metal screens. The bed volume of the ionomer particles was 50%. The 3D cathode was a stack of three commercial MMO expanded metal cathodes (Magneto Special Anode BV) with an effective surface area of 410 $m^2/m^3$ and 50 volume % cation exchange beads (LiquGen™). The catholyte was a low conductivity solution of 1 g/L $Na_2SO_4$ recirculated through the cathode compartment.

Example 8 consisted of a 3D anode with variable mass transfer coefficient and variable surface area. The first 30 cm of anode length is a stack of 2 commercial MMO expanded metal anodes (Magneto Special Anode BV) with an effective surface area of 205 $m^2/m^3$ and 50 volume % of cation exchange beads (LiquGen™) occupying the compartment volume. The final 10 cm of the anode length consists of a loose random packing of 50 volume % sintered antimony doped tin oxide particles (Stannex ELR™) mixed with 50 volume % proton selective ionomer beads (Nafion™ NR50), and current collection provided by 2 MMO expanded metal screens. The 3D cathode was a stack of three commercial MMO expanded metal cathodes (Magneto Special Anode BV) with an effective surface area of 410 $m^2/m^3$ and 50 volume % cation exchange beads (LiquGen™) occupying the compartment volume. The catholyte consisted of effluent from the anode of low conductivity treated wastewater that was passed through the cathode compartment in a single pass without any pre-treatment.

Results

The ionic conductivity of the segments of the 3D anodes in Example 3 and 6 are equal to the wastewater conductivity. The ionic conductivity of segments of the 3D anode in Example 7 with ion conducting phases were calculated using the Maxwell theoretical model. The limiting current penetration depth for each segment of the 3D anodes, Examples 3, 6 and 7, were calculated for the applied overpotential of 1V and are shown below. None of the examples achieved full current efficiency throughout the full 3D electrode. Example 3 with the highest ion conductivity in both segments of the 3D anode had the lowest energy consumption. For low conductivity wastewater, comparing Examples 6 and 7, the addition of the ion conducting phase increased the limiting current penetration depth of both 3D anode segments by 50% or more, increased the 3D electrode ion conductivity by more than 50%, increased the phenol destruction by 50% and lowered the energy consumption by 25%. Comparing Examples 3 and 7, the 3D anode with ion conducting particles achieved equal or better phenol destruction of the low conductivity wastewater versus the 3D anode with a 3× higher conductivity wastewater.

Example 3 (variable k and variable $A_e$) is more advantageous than Examples 1, 2 (constant k and constant $A_e$) because of its uniform limiting current, lower energy consumption and higher COD destruction.

Example 7 (variable k, variable $A_e$, ion conducting phases) is more advantageous than Example 6 (variable k, variable $A_e$) because of increased electrode conductivity, increased limiting current penetration depth, increased phenol destruction, lowered energy consumption.

Limiting Current Penetration Depth of 3D Electrodes

| Example # | Anode ionic conductivity segment 1 (S/m) | Anode ionic conductivity segment 2 (S/m) | Penetration depth of limiting current segment 1 (mm) | Penetration depth of limiting current segment 2 (mm) | Measured Phenol Destruction (%) | Energy Consumption (kWh/$m^3$) |
|---|---|---|---|---|---|---|
| 3 | 1.25 | 1.25 | 7.9 | 3.5 | 35 | 36 |
| 6 | 0.16 | 0.16 | 2.8 | 1.4 | 25 | 90 |
| 7 | 0.36 | 0.38 | 4.2 | 2.2 | 38 | 68 |

Example 8 eliminated the catholyte recirculation loop by using a single pass of low conductivity anode effluent (0.16 S/m) directly, without pre-treatment. The resulting effluent from the cathode was then re-combined with the effluent from the anode according to FIG. 1. Example 8 had an ion conducting phase added to the 3D electrode to increase the cathode ion conductivity shown below. Comparing Example 6 and Example 8, the phenol destruction was equivalent and the energy consumption of Example 8 was 48% lower.

Example 8 (variable k, variable $A_e$, ion conducting phases, effluent from anode as catholyte) is more advantageous than Example 6 (variable k, variable $A_e$, ion conducting phases, recirculating chemical catholyte) because Example 8 eliminates costly chemical recirculation loop, lower energy consumption for same COD destruction.

Phenol Destruction and Energy Consumption

| Example # | Catholyte | Catholyte Conductivity (S/m) | Cathode ionic conductivity (S/m) | Phenol Destruction (%) | Energy Consumption (kWh/m3) |
|---|---|---|---|---|---|
| 6 | 1 g/L $Na_2SO_4$ | 0.16 | 0.16 | 25 | 90 |
| 8 | Effluent from anode | 0.16 | 0.36 | 25 | 44 |

The invention claimed is:

1. A apparatus comprising:
a divided membrane electrochemical cell comprising an anode contained within an anode compartment and cathode contained within a cathode compartment, wherein said anode compartment and said cathode compartment are separated by a proton selective membrane, and
wherein said anode compartment additionally comprises at least one three dimensional electrode and at least one flow distributor is provided across the at least one three dimensional electrode
wherein a first segment of the at least one three dimensional electrode comprises a stack of expanded metal substrates coated with hydroxyl radical catalyst layers, a second segment of the at least one three dimensional electrode comprises a stack of expanded metal substrates coated with hydroxyl radical catalyst layers with interspersed inert glass beads as turbulence promotors, and a third electrode segment comprises a stack of expanded metal substrates coated with hydroxyl radical catalyst layers interspersed with hydroxyl radical catalyst particles
wherein at least one of said anode compartment or said cathode compartment comprises ion conducting materials in an amount from 5 to 95 volume % of said at least one of said anode compartment or said cathode compartment,
a voltage source, and
a liquid-gas separator,
wherein said at least one three dimensional electrode increases, along its length, in at least one of, specific surface area per unit volume of electrode or mass transfer coefficient in the direction of wastewater flow.

2. The apparatus of claim 1 additionally comprising at least one pre-treatment unit suitable for removing anions, cations and dissolved $CO_2$.

3. The apparatus of claim 1 wherein the energy consumption is less than or equal to 68 kWh/m³ of wastewater flow through the anode compartment.

4. The apparatus of claim 1 wherein the three dimensional electrode additionally comprises an ion conducting phase.

5. The apparatus of claim 1 wherein said at least one three dimensional electrode increases in specific surface area per unit volume of electrode in the direction of wastewater flow.

6. The apparatus of claim 1 wherein said at least one three dimensional electrode increases in mass transfer coefficient in the direction of wastewater flow.

7. A apparatus comprising:
a divided membrane electrochemical cell comprising an anode contained within an anode compartment and cathode contained within a cathode compartment, wherein said anode compartment and said cathode compartment are separated by a proton selective membrane, and
wherein said anode compartment additionally comprises at least one three dimensional electrode and at least one flow distributor is provided across the at least one three dimensional electrode,
wherein the at least one three dimensional electrode comprises a pre-treatment segment comprising a porous substrate coated with a $H_2S$, $NH_3$ and/or metal oxidation catalyst and at least two voltage tabs
wherein at least one of said anode compartment or said cathode compartment comprises ion conducting materials in an amount from 5 to 95 volume % of said at least one of said anode compartment or said cathode compartment,
a voltage source, and
a liquid-gas separator,
wherein said at least one three dimensional electrode increases, along its length, in at least one of, specific surface area per unit volume of electrode or mass transfer coefficient in the direction of wastewater flow.

8. The apparatus of claim 7 wherein the at least one three dimensional electrode additionally comprises an insulating flow distributor positioned after the pre-treatment segment.

9. The apparatus of claim 8 wherein the at least one three dimensional electrode additionally comprises a subsequent segment positioned after the insulating flow distributor and comprising a porous substrate coated with an hydroxyl radical catalyst and a voltage tab.

10. The apparatus of claim 7 wherein the at least one pretreatment segment increases in at least one of specific surface area per unit volume of electrode or mass transfer coefficient in the direction of wastewater flow.

11. The apparatus of claim 7 wherein the at least one pretreatment segment increases in at least one of specific surface area per unit volume of electrode or mass transfer coefficient in the direction of wastewater flow.

12. The apparatus of claim 7 additionally comprising at least one pre-treatment unit suitable for removing anions, cations and dissolved $CO_2$.

13. The apparatus of claim 7 wherein the energy consumption is less than or equal to 68 kWh/m³ of wastewater flow through the anode compartment.

14. The apparatus of claim 7 wherein the three dimensional electrode additionally comprises an ion conducting phase.

15. The apparatus of claim 7 wherein said at least one three dimensional electrode increases in specific surface area per unit volume of electrode in the direction of wastewater flow.

16. The apparatus of claim 7 wherein said at least one three dimensional electrode increases in mass transfer coefficient in the direction of wastewater flow.

\* \* \* \* \*